United States Patent [19]
Bauer et al.

[11] Patent Number: 5,806,479
[45] Date of Patent: Sep. 15, 1998

[54] ADDITIONAL HEATING ARRANGEMENT

[75] Inventors: Dieter Bauer, Stuttgart; Michael Humburg, Goeppingen; Michael Loehle, Esslingen; Wolfgang Pfister, Esslingen; Peter Reiser, Esslingen; Gebhard Schweizer, Leonberg, all of Germany

[73] Assignees: Behr GmbH & Co., Stuttgart; J. Eberspaecher GmbH & Co., Esslingen, both of Germany

[21] Appl. No.: 809,708

[22] PCT Filed: Sep. 29, 1995

[86] PCT No.: PCT/EP95/03856

§ 371 Date: Apr. 4, 1997

§ 102(e) Date: Apr. 4, 1997

[87] PCT Pub. No.: WO96/11121

PCT Pub. Date: Apr. 18, 1996

[30] Foreign Application Priority Data

Oct. 6, 1994 [DE] Germany ............... 44 35 693.5

[51] Int. Cl.[6] .................................................. F02N 17/06
[52] U.S. Cl. ................. 123/142.5 R; 123/41.14
[58] Field of Search ............. 123/142.5 R, 142.5 E, 123/41.14

[56] References Cited

U.S. PATENT DOCUMENTS

| | | | |
|---|---|---|---|
| 1,904,753 | 4/1933 | Smith | 123/41.14 |
| 2,016,179 | 10/1935 | Rosenqvuist | 123/41.14 |
| 3,943,325 | 3/1976 | Pickard | 123/142.5 E |
| 4,348,992 | 9/1982 | Southard | 123/142.5 R |
| 4,381,742 | 5/1983 | Funk | 123/142.5 R |
| 5,003,941 | 4/1991 | Jeffrey, Jr. et al. | 123/142.5 R |
| 5,005,542 | 4/1991 | Rissanen | 123/142.5 R |
| 5,350,114 | 9/1994 | Nelson et al. | |
| 5,558,055 | 9/1996 | Schatz | 123/142.5 R |
| 5,584,269 | 12/1996 | MacKenzie | 123/142.5 R |

FOREIGN PATENT DOCUMENTS 0 462 154   9/1990   European Pat. Off. .
39 14 834  11/1990   Germany .

*Primary Examiner*—Erick R. Solis
*Attorney, Agent, or Firm*—Foley & Lardner

[57] ABSTRACT

A cooling system of an internal combustion engine of a motor vehicle has a cooling circuit, including a coolant/air radiator for cooling the engine, and a heating circuit, including a coolant/air heat exchanger for heating the passenger compartment. The cooling system includes an additional or secondary heater integrally associated with a coolant/air radiator to increase the heating capacity. The problem encountered with modern engines, particularly diesel engines, is that too little heat is available for heating the passenger compartment. Consequently, a secondary heater is needed. The secondary heater, which can be a fuel heater with a burner part and a heat exchanger part, is integrated into the radiator. This arrangement is advantageous in that the burner, with its fuel and exhaust gas line, is located outside the passenger compartment.

20 Claims, 5 Drawing Sheets

ADDITIONAL HEATING ARRANGEMENT

BACKGROUND OF THE INVENTION

An arrangement for an additional heater in the coolant circuit of an internal combustion engine is disclosed in EP-B-0 462 154 by co-assignee. In this known arrangement, a fuel heater is integrated with the heating element of a heating system for heating the passenger compartment of a motor vehicle. Specifically the coolant-side part of the heat exchanger of the heater is in flow connection with the water tank of the heating element, so that the heat produced by the heater is given off via the exhaust gas to the coolant in the heating element and thus becomes directly effective for heating the passenger compartment. The disadvantage in this arrangement is that both the fuel supply for the additional heater and the supply of exhaust gas from the additional heater have to pass through the passenger compartment or directly at the edge of the passenger compartment, which is not desirable. Moreover, the noise of the burner and the burner fan may lead to adverse effects on the comfort in the passenger compartment.

SUMMARY OF THE INVENTION

The object of the present invention is to avoid the above-mentioned disadvantages and to provide an arrangement for an additional heating device that does not adversely affect safety and comfort and can take over the function of shortening the hot running phase of the internal combustion engine and the function of stationary mode heating.

This object can be achieved by a coolant/air radiator assembly for cooling an internal combustion engine of a motor vehicle, where the engine is a primary heater. The assembly comprises a radiator for cooling the engine and an additional or secondary heater integrally mounted to the radiator and communicating with the radiator so that fluid from the radiator can flow through the secondary heater. The advantage in this arrangement on the radiator or on a cooling module is that safety risks and adverse effects due to noise for the passenger are avoided insofar as the additional heater is now located outside the passenger compartment. Owing to the constructional integration with the coolant/air radiator, the entire assembly and also the accessibility of the additional heater are simplified. Furthermore, the inclusion of the additional heating in the coolant circuit can be designed in a simpler and cost-effective manner. Additionally, the fuel and exhaust gas lines can be installed without difficulty.

Further advantageous aspects of the invention emerge from the following.

According to another aspect of the invention, the additional heater is integrated with the water tank of the radiator, which is preferably configured as a cross flow radiator. This results in a favorable arrangement of the additional heater in terms of space, keeping the constructional height of the overall radiator low. By accommodating the additional heater in the pot-shaped housing on the water tank, no further fastening means are required.

According to another aspect of the invention, no further connection lines for the coolant are required either since the latter enters the heat exchanger part of the additional heater directly from the water tank.

According to another aspect of the invention, the thermostat valve and the radiator bypass line are also integrated in the water tank, which leads to a further simplification in respect of the coolant lines, to a compact constructional unit and to efficient assembly of the overall cooling module.

According to another aspect of the invention, integration of the additional heater is even possible in the case of a down flow radiator, i.e., with pipes running vertically, if there is adequate constructional space available.

According to another aspect of the invention, the additional heater is connected in parallel with the radiator feed line, i.e., a partial flow defined by a throttle runs in the bypass over the additional heater, heats up there and is then fed back into the radiator feed line. This variant is thus self-regulating, i.e., without additional regulating outlay.

According to another aspect of the invention, the additional heater is connected in series in the heating feed line, as a result of which the additional heat primarily benefits the heating element, i.e., advantageously makes more rapid and more effective heating possible, in particular, in the case of engines with a high degree of efficiency, such as for example diesel engines.

According to another aspect of the invention, an additional water pump is provided, which provides circulation in the heating feed line and thus ensures more rapid heat conveyance.

According to another aspect of the invention, the switch-over valve and an additional branch line provide the possibility for stationary mode heating, which can be maintained by the additional electric pump when the engine is switched off.

BRIEF DESCRIPTION OF THE DRAWINGS

Exemplary embodiments of the invention are illustrated in the drawing and will be described in greater detail below.

DETAILED DESCRIPTION OF THE PREFERRED EMBODIMENTS

Figure 1:
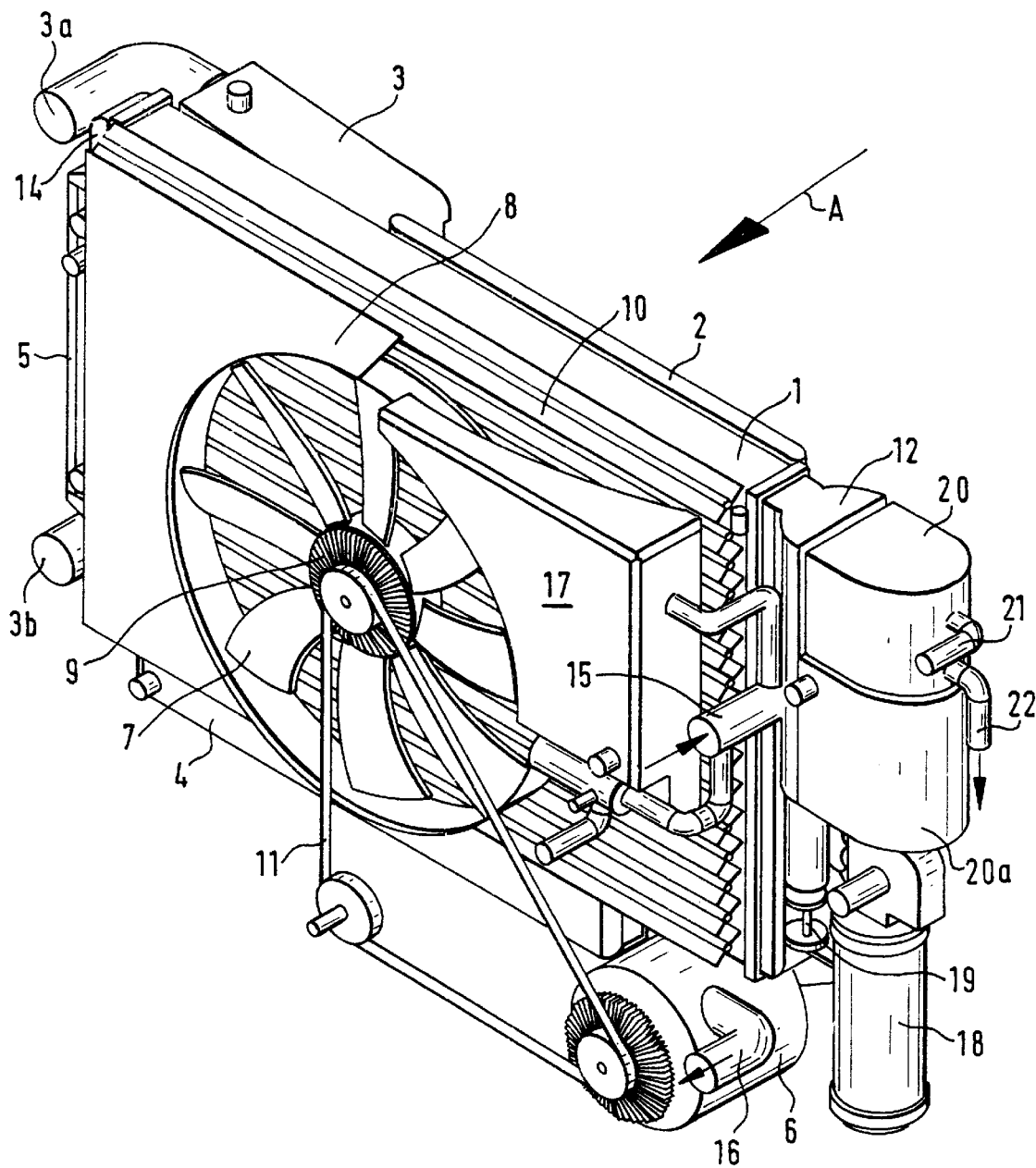
FIG. 1 shows a cooling assembly in a perspective illustration.

FIG. 1 shows a cooling assembly or a so-called cooling module, i.e., an arrangement of a plurality of heat exchangers combined to form a constructional unit and are fastened as a complete assembly unit in a motor vehicle. Specifically, these are the following heat exchangers: coolant/air radiator 1, coolant/air condenser 2, charging air/air cooler 3 with inlet and outlet nozzles 3a and 3b, transmission oil/coolant cooler 5 and engine oil/air cooler 4. The air flow direction is indicated by the arrow A, i.e., the air firstly impinges on the condenser 2 and the charging air cooler 3, then flows through the coolant radiator 1 behind which there is a radiator louver 10 that controls the cross section through which air can flow. Arranged on the coolant radiator 1 on the downstream side is a radiator cowl 8 inside which there is arranged a fan 7 for moving air. The fan 7 is driven by means of a fluid friction clutch 9, which in turn, is driven by the internal combustion engine (not illustrated here), via a belt drive 11. Other types of drive for the fan 7 are possible, e.g., drive via an electric motor or direct drive via the crankshaft. Furthermore, a heatable wiper water container 17 is integrated in the fan cowl 8. As already mentioned, the heat exchangers are combined to a fixed constructional unit, i.e., either directly connected to one another or fastened on a module carrier (not illustrated), which is then fastened in turn to the body of the vehicle. The coolant radiator 1 is configured as a so-called cross flow radiator, i.e., it has a grid of horizontal pipes that cannot be seen in the drawing and two lateral water tanks: the right-hand water tank 12 having an inlet nozzle 15 for the coolant and, below the inlet nozzle 15, a separating wall (not illustrated). The left-hand water tank is configured as a deflection water tank 14. Consequently, the coolant initially flows from right to left (in the drawing) through the upper rows of pipes, is deflected in the left-hand water tank 5 and flows back through the lower rows of pipes, i.e., below the separating wall (not illustrated) in the water tank 12 from left to right, where it is extracted from the lower part of the water tank 12 by means of a coolant pump 6 and leaves the coolant pump via an outlet nozzle 16. Finally, the cooling assembly also has a fluid container 18 for coolant with an integrated dryer and a coolant thermostat 19, which is likewise integrated in the water tank 12. The individual heat exchangers are thus air-cooled, apart from the transmission oil cooler. The latter is inserted into the water tank 5 and is acted upon by the coolant on the secondary side.

According to the invention, an additional heater 20, 20a with fuel heating and an exhaust gas/coolant heat exchanger, as is known in principle from EP-B-0 462 154 of the co-assignee, is connected mechanically and in terms of flow to the water tank 12, i.e., integrated to form a constructional unit. The additional heater is illustrated in two parts in the drawing, the top part 20 essentially containing the burner and the bottom part 20a containing the heat exchanger. The connection lines for the coolant heated up in the additional heater (heat exchanger part) 20a are not illustrated and are located inside the water tank 12. They correspond in principle to the abovementioned prior art. Located on the additional heater 20 are a connection 21 for the burner air and a nozzle 22 for the outlet of the exhaust gas. The fuel supply for the additional heater 20 is not illustrated in the drawing.

Figure 2:
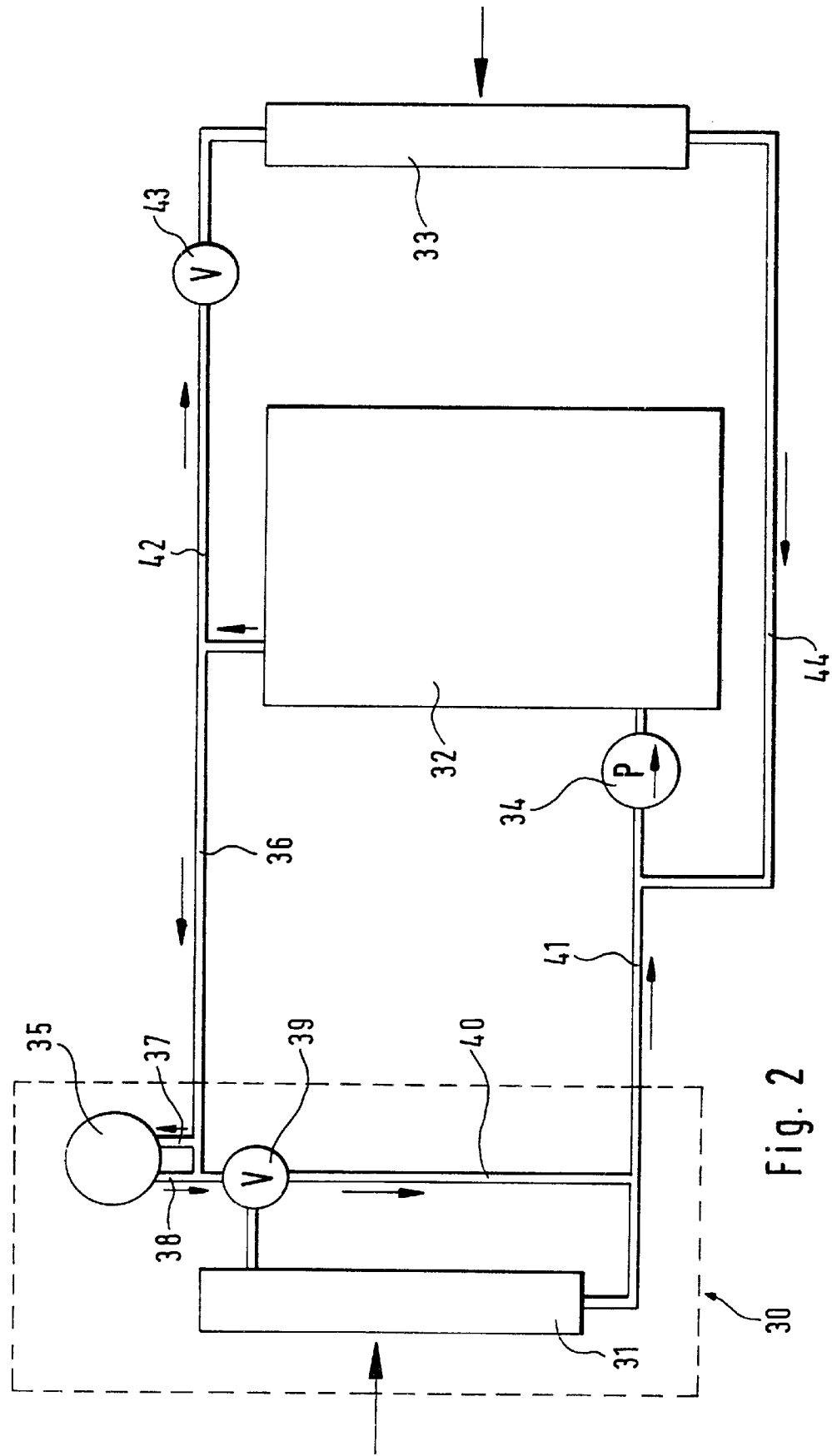
FIG. 2 shows a first circuit arrangement for the cooling assembly.

FIG. 2 shows a diagrammatic illustration of the inclusion or flow-related arrangement of the additional heater in the coolant circuit of an internal combustion engine. Here, the additional heater 20 from FIG. 1 is given the reference numeral 35, which denotes the coolant-side part of the heat exchanger of this device. The overall cooling assembly according to FIG. 1 is illustrated in a simplified form in the dashed rectangle and comprises the radiator 31, the additional heater 35, a thermostat 39 and a bypass line 40. The coolant circuit for the internal combustion engine 32 has a radiator feed line 36 and a radiator return line 41, which is fed back to the internal combustion engine 32 again via a coolant pump 34. A heating circuit is provided in parallel with this "cooling circuit" and comprises a heating feed line 42 with a heating valve 43, heating element 33 and heating return line 44. The coolant side 35 of the additional heater is connected in parallel with the radiator feed line 36, specifically via an inflow 37 in which there is a fixed throttle for partial flow control, and via a return flow 38. A specific constant volume of coolant thus flows over the additional heater and thus heats the coolant. When the thermostat 39 is closed, heated coolant enters the bypass line 40 and flows from there via the radiator return line 41 and the pump 34 into the cooling jacket of the internal combustion engine 32, which is thus heated more rapidly. Additionally, the volume of coolant heated by the additional heater 35 passes via the heating feed line 42 into the heating element 33, as a result of which deficits in the heating capacity, e.g., of modern TDI engines, are compensated and/or the heating is with accelerated, —thus improving the heating of the passenger compartment.

Figure 3:
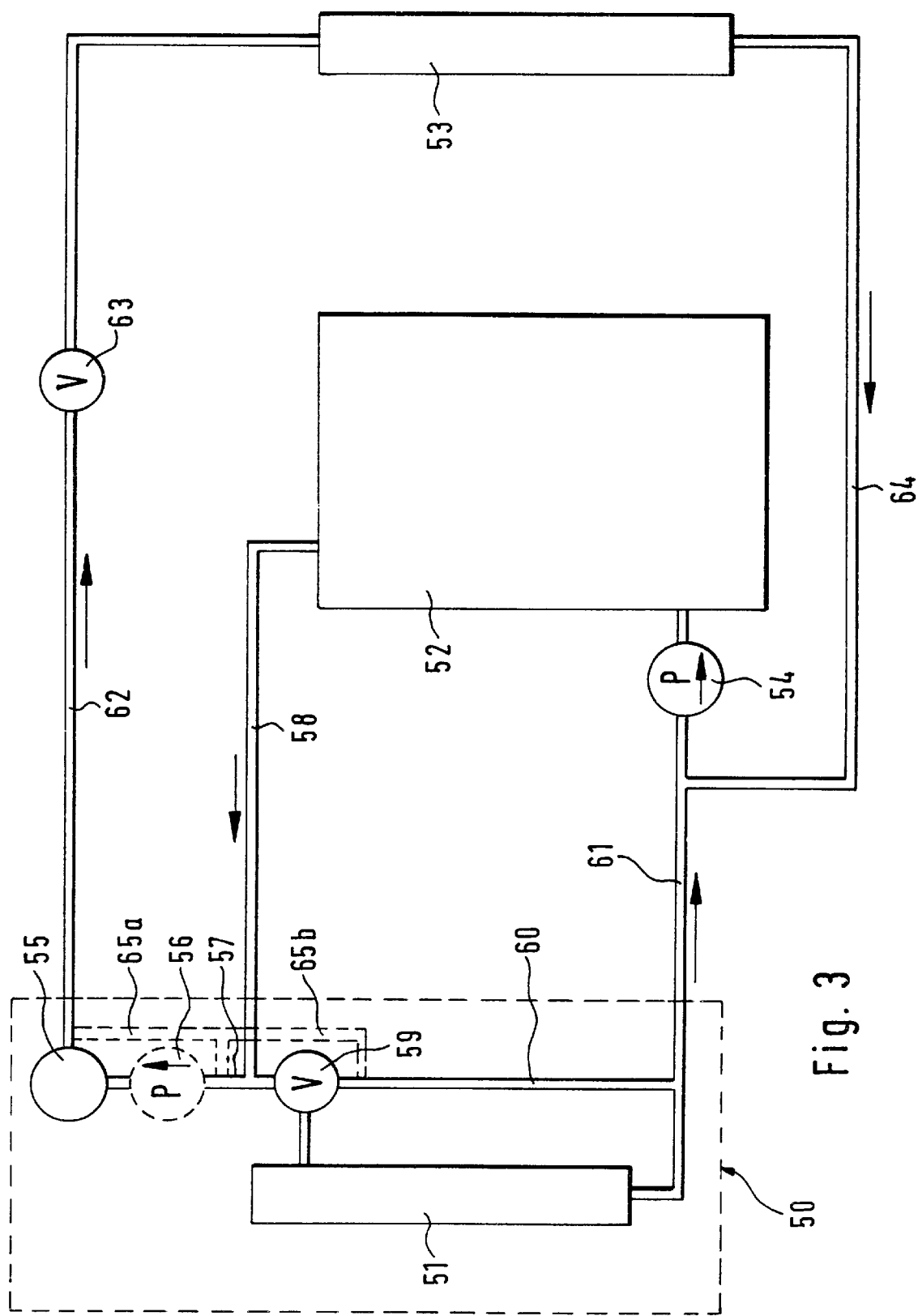
FIG. 3 shows a second circuit arrangement for the cooling assembly.

FIG. 3 shows a further variant of the arrangement of the additional heater 55 in the coolant circuit of the internal combustion engine 52. Here, the cooling assembly is again indicated by a dashed rectangle 50 and contains the radiator 51, the additional heater 55, optionally an electric water pump 56 and a thermostat valve 59 with a short-circuit bypass 60. The actual cooling circuit comprises the radiator feed line 58 and the radiator return line 61, including the coolant pump 54. In contrast, the heating circuit comprises the heating feed line 62, a heating valve 63, a heating element 53 and the heating return line 64. Here the additional heater 55 is thus connected via the branch line 57 in series with the electric water pump 56, to be provided optionally, in the heating feed line 62. By means of a return line 65a or 65b, a minimal throughflow of the additional heater is ensured with the valve 63 closed for safe switch-off in the event of overheating.

Figure 4:
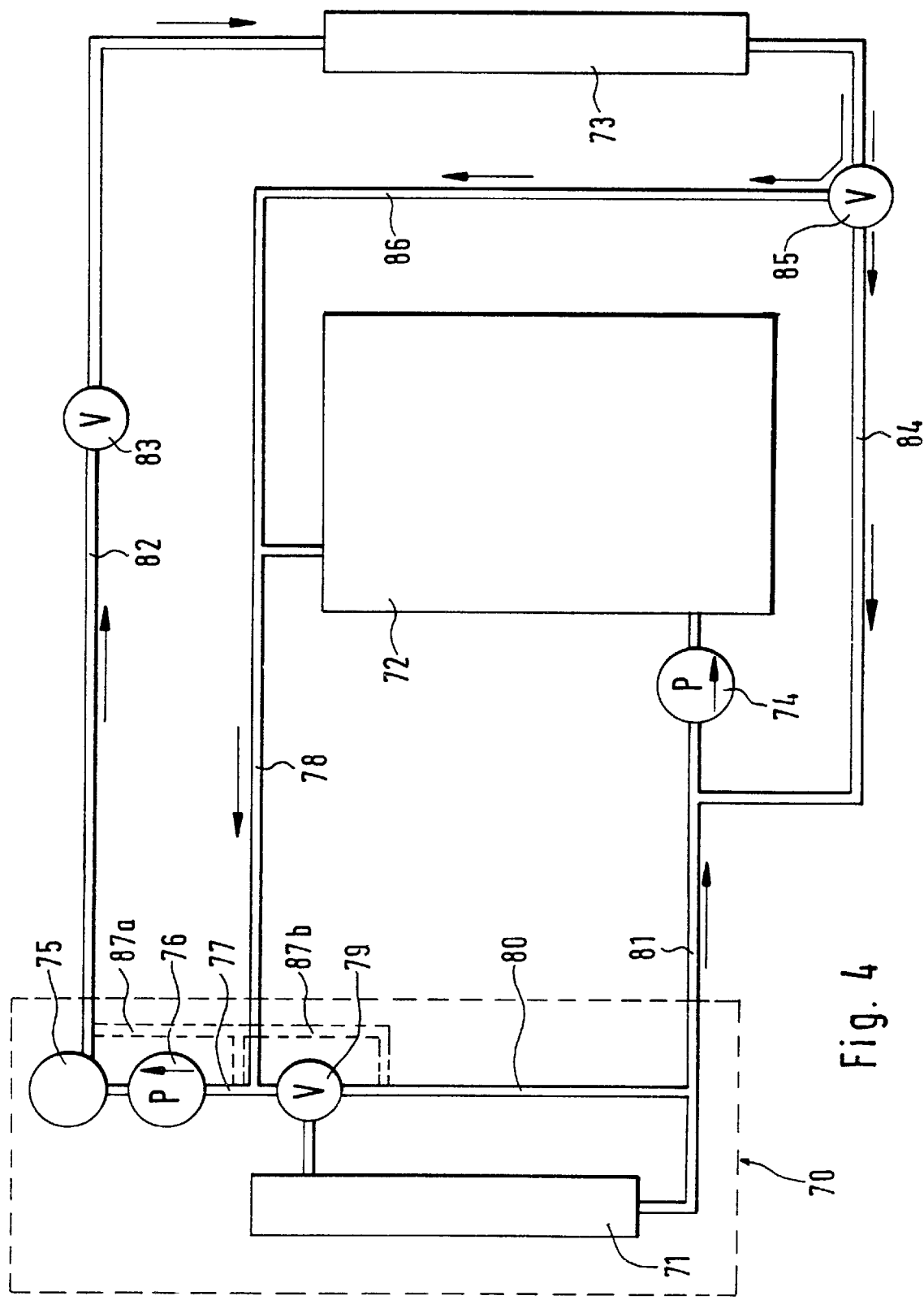
FIG. 4 shows a third circuit arrangement for the cooling assembly in the coolant circuit of an internal combustion engine.

FIG. 4 shows a final variant of the arrangement of the additional heater 75 in the coolant circuit of the internal combustion engine 72, the cooling assembly again being indicated as a dashed rectangle 70 with its components, such as the radiator 71, thermostat 79, electric water pump 76, and bypass 80. The cooling circuit, including the radiator 71, has a radiator feed line 78 and a radiator return line 81 with the coolant pump 74. Connected in parallel with this cooling circuit is a heating circuit, specifically with a heating feed line 82, heating valve 83, heating element 73, and heating return line 84, which opens into the radiator return line 81 ahead of the coolant pump 74. Finally, a branch line 86 is provided additionally (supplementing the exemplary embodiment according to FIG. 3), which can be opened or closed by means of a solenoid valve 85. For the purpose of stationary mode heating for the vehicle, this valve 85 is open to the line 86 and closed to the line 84 in the currentless state. The electric water pump 76 conveys water heated in the additional heater 75 via the heating feed line 82 through the heating element 73, via the branch line 86 into the radiator feed line and from there, with the thermostat 79 closed, via the branch line 77 back to the water pump 76. If the valve 85 is powered by electricity, the line 86 is separated, and the coolant flows out of the heating element 73 into the heating return line 84 so that the so-called additional heating function, which is also present in the previous exemplary embodiments, is thus fulfilled. In analogy to the preceding exemplary embodiment, a return line 87a or 87b can be also provided here.

Figure 5:
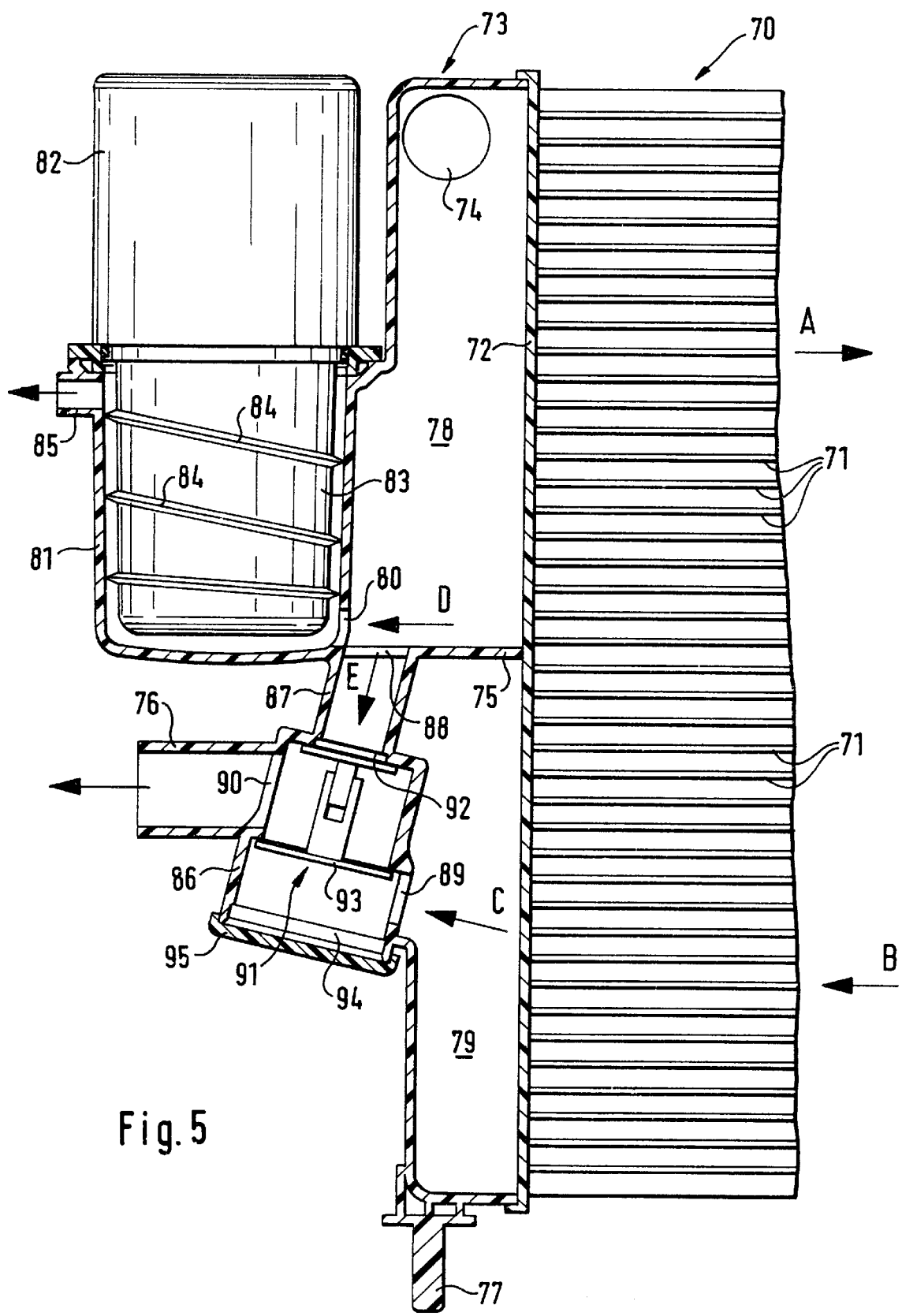
FIG. 5 shows a water tank with an integrated additional heater in section.

FIG. 5 shows a sectional illustration of a water tank with an integrated additional heater, as is shown in a perspective illustration in FIG. 1. In the following text, the reference numerals from FIG. 1 are put in brackets for corresponding parts. FIG. 5 shows the left-hand outer part of a cross flow radiator 70 (1), whose pipes 71 open into a pipe base 72 connected in a sealing manner to a water tank 73 (12). The water tank 73, which is preferably produced as an injection molded plastic part, has an inlet nozzle 74 (15), a separating wall 75 and an outlet nozzle 76 (16). The radiator 70 is thus configured as a cross flow radiator with pipes 71 lying horizontally and is fastened to the vehicle body by appropriate fastening means. A journal 77 molded onto the water tank 73 is illustrated as an example of such a fastening means. The entire water tank 73 is subdivided by the separating wall 75 into an upper inflow chamber 78 and a lower outflow chamber 79, a pot-shaped housing 81 being connected to the upper chamber 78 via an inflow opening 80, which housing is configured to be integral with the water tank 73 and accommodates the additional heater 82/83 (20/20a). The lower part of the additional heater is configured as a heat exchanger 83 and has, on its outer jacket, helically arranged ribs 84 for conducting the coolant from the inlet opening 80 arranged at the pot base upward to where an outlet nozzle 85 is arranged. Arranged in the region of the lower chamber 79 is a thermostat housing 86 connected to the upper chamber 78 by means of a short-circuit or bypass pipe piece 87 adjoining the separating wall 75. Furthermore, an inflow opening 89 from the lower chamber 79 and an outflow opening 90 to the outlet nozzle 76 are provided additionally in the thermostat housing 86. Inside the thermostat housing 86 there is a thermostat valve 91, which is known per se and which, with its two valve plates 92, 93, either closes or releases the bypass 87 or the inflow 89 from the lower chamber 79.

The thermostat housing 86 and the bypass nozzle 87 are designed in terms of injection molding in such a way that they can be produced in one piece with the water tank 73 an opening 94 being provided for demolding. The opening is subsequently closed by means of a cap 95. Thus, both the additional heater 82/83 and the thermostat 91 and the radiator bypass 87 are integrated in the water tank 73.

The functioning of this radiator with the additional heater is as follows:

The coolant entering the upper chamber 78 through the inlet nozzle 74 initially flows in the direction of the arrow A through the upper half of the pipe bundle 71, is deflected in a right-hand water tank (not illustrated) and then flows through the lower half of the pipe bundle 71 according to the direction of the arrow B back into the lower chamber 79 of the water tank 73. The latter applies for the case of the coolant already having been heated and the thermostat 91 closing the bypass 87 by means of the bypass valve plate 92—then the valve plate 93 opens the throughflow cross section so that the coolant passes via the opening 89 in the direction of the arrow C into the interior of the thermostat housing and from there flows via the outlet opening 90 to the outlet nozzle 76. If the coolant has not yet been heated, the bypass 87 is open, i.e., the bypass valve plate 92 is lifted up from its valve seat, and the valve plate 93 closes the return flow cross section. In this mode of operation, the coolant does not flow through the radiator since the coolant flows through the bypass 87 in the direction of the arrow E.

According to the invention, a partial flow of the coolant branches off from the upper chamber 78 and enters in the direction of the arrow D through the overflow opening 80 into the gap between the outer jacket of the heat exchanger 83 and the inner wall of the pot 81, flows around the heat exchanger 83 owing to the helically arranged ribs 84 on a corresponding path upward and exits again through the outlet nozzle 85 in a heated state. This heated coolant is then, depending on the circuit arrangement, either fed directly to the cooling jacket of the internal combustion engine or to the vehicle heating.

We claim:

1. A coolant circuit of an internal combustion engine of a motor vehicle, comprising:
    a coolant/air radiator for cooling the engine, which is a primary heater;
    a fluid tank arranged laterally of and integrated with the radiator and communicating coolant with the radiator;
    a pot-shaped housing integral with the fluid tank and communicating coolant with the fluid tank;
    a coolant/air heating element communicating with the radiator for heating a passenger compartment; and
    a secondary heater, which is separate from and not associated with the primary heater, received in the pot-shaped housing.

2. The coolant circuit according to claim 1, wherein the radiator is a cross-flow radiator.

3. The coolant circuit according to claim 1, wherein the fluid tank is positioned between the pot-shaped housing and the radiator.

4. The coolant circuit according to claim 3, wherein the secondary heater comprises a heating part and a heat exchanger part, the pot-shaped housing accommodating the heat exchanger part, the heat exchanger part being exposed to coolant from the fluid tank.

5. The coolant circuit according to claim 4, wherein the housing is separated from the fluid tank by a common wall, which includes an opening to communicate coolant, wherein the housing has an outlet, coolant being adapted to flow from the fluid tank via the opening to the housing accommodating the heat exchanger part, which heats the coolant, and the heated coolant exiting the housing via the outlet.

6. The coolant circuit according to claim 5, wherein the fluid tank has a separating wall dividing the tank into an upper chamber and a lower chamber, the separating wall having an overflow opening communicating the upper and lower chambers, the upper chamber having an inlet and the lower chamber having an outlet, and including a thermostat housing situated between the overflow opening and the lower chamber outlet, the thermostat housing accommodating a thermostat valve to permit coolant to flow from the upper chamber to the lower chamber outlet.

7. The coolant circuit according to claim 1, wherein the radiator is a down flow radiator.

8. The coolant circuit according to claim 6, further comprising a radiator feed line from the engine, wherein the secondary heater is connected in parallel with the radiator feed line.

9. The coolant circuit according to claim 8, further comprising a fixed throttle for controlling flow of coolant to the secondary heater.

10. The coolant circuit according to claim 8, further comprising a heating feed line connected to the heating element, wherein the secondary heater feeds coolant directly to the heating feed line.

11. The coolant circuit according to claim 10, further comprising an electric fluid pump connected in series with the secondary heater and the heating feed line.

12. The coolant circuit according to claim 11, further comprising a heating return line connecting the heating element and the engine, a switch-over valve arranged in the heating return line, and a branch line connecting the radiator feed line and the switch-over valve, the switch-over valve routing coolant through either the heating return line to feed coolant from the heating element to the engine or through the branch line to feed coolant from the heating element to the radiator feed line.

13. A coolant/air radiator assembly for cooling an internal combustion engine of a motor vehicle, where the engine is a primary heater, the assembly comprising:
    a radiator for cooling the engine;
    a fluid tank arranged laterally of and integrated with the radiator and fluidly communicating therewith;
    a pot-shaped housing integral with the fluid tank and communicating coolant with the fluid tank;

a secondary heater, which is separate from and not associated with the primary heater, received in the pot-shaped housing.

14. The radiator assembly according to claim 13, wherein the radiator is a cross-flow radiator.

15. The radiator assembly according to claim 14, wherein the fluid tank is positioned between the pot-shaped housing and the radiator.

16. The radiator assembly according to claim 15, wherein the secondary heater comprises a heating part and a heat exchanger part, the pot-shaped housing accommodating the heat exchanger part, the heat exchanger part being exposed to coolant from the fluid tank.

17. The radiator assembly according to claim 16, wherein the housing is separated from the fluid tank by a common wall, which includes an opening for communicating coolant, wherein the housing has an outlet, coolant being adapted to flow from the fluid tank via the opening to the housing accommodating the heat exchanger part, which heats the coolant.

18. The radiator assembly according to claim 17, wherein the fluid tank has a separating wall dividing the tank into an upper chamber and a lower chamber, the separating wall having an overflow opening communicating the upper and lower chambers, the upper chamber having an inlet and the lower chamber having an outlet, and including a thermostat housing situated between the overflow opening and the lower chamber outlet, the thermostat housing accommodating a thermostat valve to permit coolant to flow from the upper chamber to the lower chamber outlet.

19. A coolant/air radiator assembly for cooling an internal combustion engine of a motor vehicle, where the engine is a primary heater, the assembly comprising;

a radiator for cooling the engine;

a fluid tank arranged laterally of and integrated with the radiator and fluidly communicating therewith;

a pot-shaped housing integral with the fluid tank, the pot-shaped housing and the fluid tank being separated by a common wall having an opening to communicate coolant with the radiator, the pot-shaped housing having an outlet for exiting coolant from the radiator; and a secondary heater, which is separate from and not associated with the primary heater, received in the pot-shaped housing.

20. The coolant/air radiator assembly according to claim 19, wherein the secondary heater comprises a burner and a heat exchanger, the heat exchanger being received in the pot-shaped housing.

* * * * *